United States Patent [19]

Torok et al.

[11] Patent Number: 4,694,472

[45] Date of Patent: Sep. 15, 1987

[54] CLOCK ADJUSTMENT METHOD AND APPARATUS FOR SYNCHRONOUS DATA COMMUNICATIONS

[75] Inventors: Gabor P. Torok, Holmdel, N.J.; Andrew B. White, Urbana, Ill.

[73] Assignees: American Telephone and Telegraph Company, New York, N.Y.; Bell Telephone Laboratories, Incorporated, Murray Hill, N.J.

[21] Appl. No.: 585,456

[22] Filed: Mar. 2, 1984

Related U.S. Application Data

[63] Continuation of Ser. No. 371,661, Apr. 26, 1982, abandoned.

[51] Int. Cl.[4] .............................. H04L 7/00
[52] U.S. Cl. .................................. 375/107; 307/511; 328/72
[58] Field of Search ...................... 375/38, 40, 42, 107, 375/118, 119, 120; 370/43, 100, 102, 103, 86, 87, 88; 307/511; 328/72; 371/46

[56] References Cited

U.S. PATENT DOCUMENTS

| 3,453,594 | 7/1969 | Jarvis | 375/107 |
|---|---|---|---|
| 3,590,381 | 6/1971 | Ragsdale | 325/30 |
| 3,873,773 | 3/1975 | Guy, Jr. | 375/112 |
| 3,908,084 | 9/1975 | Wiley | 179/15 |
| 3,980,820 | 9/1976 | Niemi et al. | 178/69.5 |
| 3,982,075 | 9/1976 | Jefferis et al. | 375/107 |
| 4,004,090 | 1/1977 | Goto et al. | 178/69.1 |
| 4,004,098 | 1/1977 | Shimasaki | 370/104 |
| 4,005,266 | 1/1977 | Lehr et al. | 375/107 |
| 4,049,910 | 9/1977 | Jolivet et al. | 370/102 |
| 4,095,053 | 6/1978 | Duttweiller et al. | 370/102 |
| 4,147,895 | 4/1979 | Fenoglio | 370/102 |
| 4,189,622 | 2/1980 | Foshee | 178/69.1 |
| 4,253,181 | 2/1981 | Watten | 370/103 |
| 4,259,738 | 3/1981 | Liskov et al. | 370/102 |
| 4,385,396 | 5/1983 | Norton | 375/120 |
| 4,503,490 | 3/1985 | Thompson | 375/106 |

Primary Examiner—Robert L. Griffin
Assistant Examiner—Stephen Chin
Attorney, Agent, or Firm—John A. Caccuro

[57] ABSTRACT

The disclosed clock adjustment method and apparatus utilizes a periodically transmitted positive or negative predetermined fixed increment clock phase adjustment signal to phase adjust the clocks of the system. The transmitter clock is periodically compared with a common reference clock and a fixed increment clock adjustment signal is transmitted to the receiver which adjusts its clock by applying the fixed increment clock adjustment signal to the common reference clock. The utilization of a predetermined fixed increment clock phase adjustment signal eliminates the need to send the resolution of the clock adjustment and hence reduces the number of data bits required to send clock information over the communication channel.

18 Claims, 3 Drawing Figures

CLOCK ADJUSTMENT METHOD AND APPARATUS FOR SYNCHRONOUS DATA COMMUNICATIONS

This is a continuation of patent application Ser. No. 371,661, filed Apr. 26, 1982, now abandoned.

TECHNICAL FIELD

This invention relates to data transmission and more particularly to a clock frequency adjustment method and apparatus for synchronous data transmission.

BACKGROUND OF THE INVENTION

In synchronous data communication systems a problem exists to maintain the clock at the receiver in phase synchronization with the clock at the transmitter. Synchronization is needed to enable clock signals at the receiver to coincide with the center of the received data pulses, thus assuring that data bits are not added, lost or misinterpreted during data transmission. In addition to keeping the receive clock in exact synchronization with the transmit clock, there is a need to control the instantaneous phase jitter of the receive clock with respect to the long term average clock frequency. Typically, this maximum phase jitter may be of the order of 0.5 percent of a single clock period.

One prior art technique for synchronizing the receiver clock to the transmitter clock includes sending the clock information as part of the transmitted data. At the receiver location the clock information is extracted from the received data. The transmission of clock information as part of the data requires that the data be transmitted continuously over the facility to the receiver. However, when data is transmitted in a non-continuous bursty manner or is multiplexed together with other signals, the clock information is not easily derived from the transmitted data.

In these bursty or multiplex data transmission systems the clock information is usually transmitted as separate data over the facility. When a common reference clock is available at the transmitter and receiver differential clock information is sent relative to this reference clock. Typically, the differential clock information is transmitted by the transmitter periodically, usually determined by either a time interval or by the number of data bits transmitted. The interval between clock information transmissions is usually determined by the required system clock tolerance and the stability of the transmitter and receiver clocks. The received differential clock information is combined with the facility reference clock to synchronize the receiver clock within the specified system clock tolerance of the transmitter clock. Thus, the transmitted differential clock information must contain enough data bits of information to enable a resolution of clock phase to within the system clock jitter tolerance.

For example, if the system clock jitter tolerance is ±0.5 percent, then the transmitted differential clock information must contain at least 8 bits ($2^8 = 256$ steps or about 0.4 percent/step) to specify the receiver clock phase within ±0.5 percent of the transmitter clock phase. Moreover, the relative drift of the transmitter and receiver clocks often determines how frequently the receiver clock must be resynchronized. Thus, for example, if transmitter and receiver clocks have a relative drift of 125 parts per million (PPM) per cycle (or per bit), then to maintain a system clock jitter tolerance of ±0.5 percent requires sending clock information every 40 data bits 0.5 percent/125 PPM. In such a system 8 bits of differential clock information must be sent after each 40 data bits to maintain the receiver clock with the ±0.5 percent tolerance of the transmitter clock. Thus undesirably, transmission of the clock information requires almost 17 percent (8 bits out of 48 total) of all the data sent (8 bits out of 48 total) by the transmitter.

If a synchronous data communication system is to be efficient, the utilization of valuable data channel capacity for clock information transmission should be minimized. However, in systems which do not have the added capacity required for transmitting the clock information data, maintaining the receiver clock within the specified tolerance of the transmitter clock may not be possible using the above method.

SUMMARY OF THE INVENTION

The present invention recognizes that instead of transmitting the absolute clock phase difference between the transmitter clock and the common system clock, it is sufficient to periodically transmit a signal indicating that a positive or negative predetermined fixed increment clock phase adjustment is to be made to the receiver clock. By utilizing a predetermined fixed increment clock adjustment signal, only one data bit (for the sign information) is required to send clock information to the receiver. The result is that the transmission of clock information has a minimal effect on the data transmission efficiency of a synchronous data communication system.

More particularly, in the present inventive clock adjustment method and apparatus, the transmitter clock is periodically compared with a reference clock derived from a common facility clock. Periodically, in response to this comparison, an encoded clock phase adjustment signal is sent to the receiver indicating that a predetermined fixed increment phase adjustment is to be made to a similarly derived reference clock at the receiver. To maintain synchronism between the transmitter and receiver the reference clock at the transmitter is also rephased using the fixed increment phase adjustment (±0.5 percent). Since the receiver knows the resolution of the fixed increment phase adjustment, only the sign of the increment is actually transmitted. Hence, the fixed increment phase adjustment signal consists of only one bit of data which is used to indicate that either a positive or negative fixed clock phase adjustment of 0.5 percent is required at the receiver. In an alternate embodiment, two bits of data is utilized to indicate a positive, negative or no clock adjustment step at the receiver. The no clock adjustment message is sent when the difference between the transmitter clock and the reference clock is less than ±0.5 percent.

The periodic transmission of these one or two bit fixed increment clock phase adjustment (lead/lag) signals maintains the receiver clock within a predetermined jitter tolerance (±0.5 percent) of the transmitter clock. The result is an efficient synchronous communication system where little channel capacity is utilized to maintain clock synchronization between the transmitter and receiver.

BRIEF DESCRIPTION OF THE DRAWING

The detailed description of the invention will be more fully appreciated from the illustrative embodiment shown in the drawings in which.

DETAILED DESCRIPTION

Figure 1:
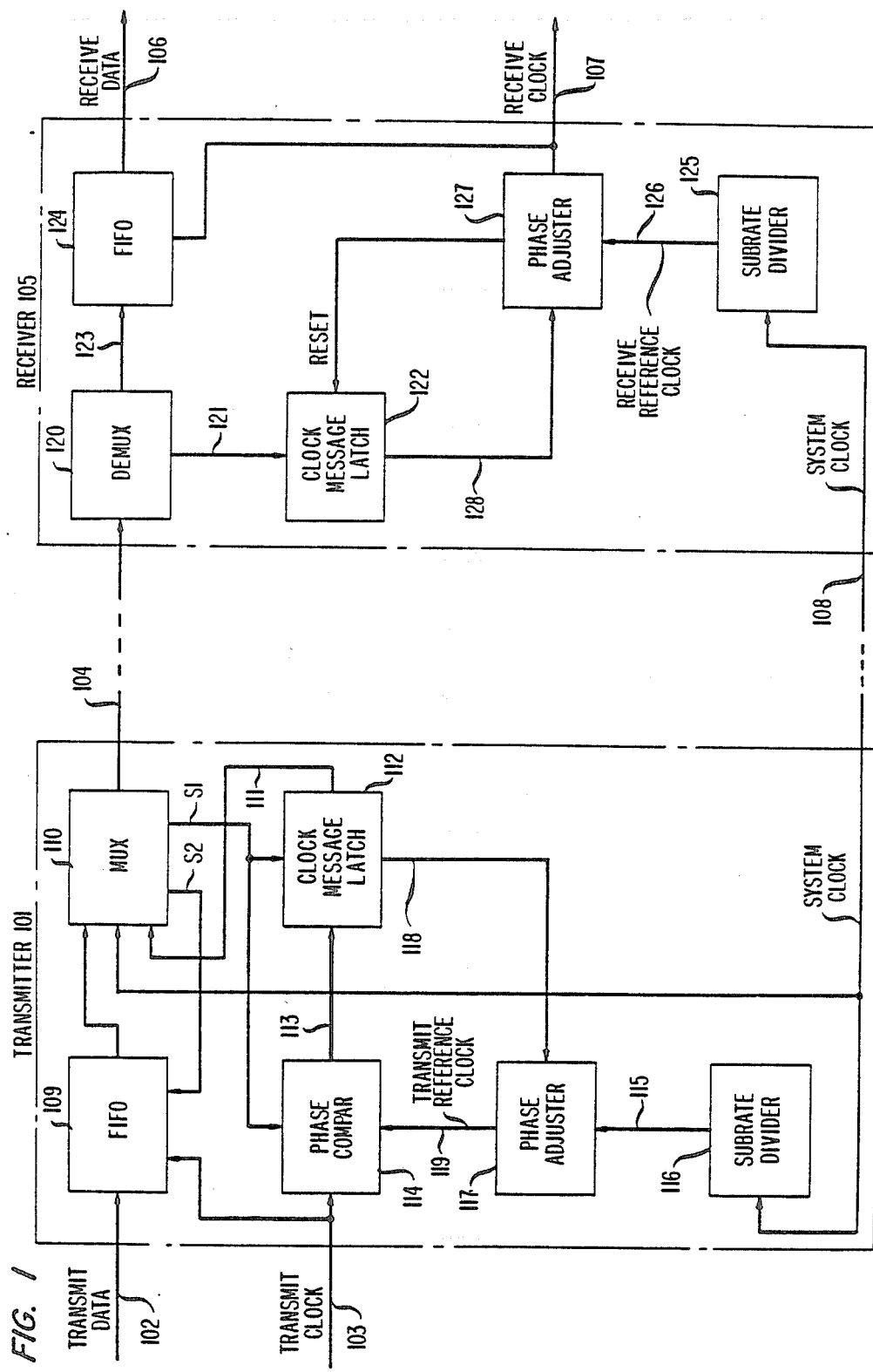
FIG. 1 shows a block diagram of the disclosed clock adjustment apparatus as used in a synchronous data communication system.

Shown in FIG. 1 is a block diagram of the present inventive clock adjustment apparatus as used in a synchronous data communication system consisting of transmitter 101 and receiver 105. Transmitter 101 receives transmit data over lead 102 and a transmit clock signal over lead 103 from the user's transmitter (not shown). While data is received from the user at the user's data rate, data transmission between transmitter 101 and receiver 105 of the system occurs over data facility (channel) 104 at the data communication rate of the system. Since the system transmits both the clock signal and data signal of the user the data transmission rate of the system must exceed the data transmission rate of the user. A common system clock 108 is made available at both transmitter 101 and receiver 105. This system clock can be distributed over separate transmission facilities 108 or can be derived from the data transmitted on communication channel 104.

When data is received by receiver 105 it is outputted via lead 106 to the user's receiver (not shown). Additionally, a receive clock signal is outputted to the user over lead 107. As will be described hereinafter the present invention is directed to maintaining the user's receive clock signal within a given tolerance of the user's transmit clock signal.

Referring to transmitter 101, transmit data is clocked into a standard well-known first-in-first-out (FIFO) register 109 using the user's transmit clock signal on lead 103. The capacity of FIFO 109 is selected to buffer differences between the user's data transmission characteristics and the data transmission characteristics of the communication system. FIFO 109 enables data to be received continuously from the user and transmitted in a burst mode over data facility 104. Data from FIFO 109 is clocked out periodically in data bursts of one or more data bytes (usually 8 bits, but may be any number of predefined bits) at the higher system data rate via strobe lead S2 from multiplexer 110. The data output from FIFO 109 is time multiplexed in a standard multiplexer 110 together with a clock adjustment message which is received over lead 111 from clock message latch 112. Strobe S1 from multiplexer 110 provides the proper timing for transmitting the clock message. Although multiplexer 110 shows two information sources from FIFO 109 and latch 112, in a generalized implementation numerous data sources may be multiplexed onto transmission channel 104.

Clock message latch 112 receives several signals over bus 113 from phase comparator 114 which compares the transmit clock 103 with a transmit reference clock 119. Transmit reference clock 119, the output of phase adjustment circuit 117, is derived from and phase locked to the system clock 108 by subrate divider 116 and phase adjustment circuit 117. Subrate divider 116 may be a standard well known programmable counter circuit which is preprogrammed to derive a clock signal 115 of the same nominal frequency as transmit clock 103. Phase adjustment circuit 117 is a well-known adjustable counter which can count the input clock signal 115 to a programmable limit. In the disclosed apparatus, phase adjustment circuit 117 is arranged to multiply an input frequency by 1 or by 1 ±0.005, since it is assumed that the fixed clock phase adjustment is ±0.5 percent. The output count of phase adjustment circuit 117 is preset to 1 or 1±0.005 by lead 118 from clock message latch 112.

Phase comparator 114 is a standard well-known binary comparator arranged in a well-known manner to compare transmit clock 103 with transmit reference clock 119 and to output, on bus 113, binary signals indicating when the transmit reference clock 119 has drifted by the predetermined amount of ±0.5 percent from the transmit clock 103. Typically, leads 113 would include three leads which indicate, respectively, that transmit reference clock 119 is 0.5 percent faster (leads), 0.5 percent slower (lags) or within the 0.5 percent limit of transmit clock 103. A single lead is sufficient if only lead or lag adjustments are transmitted.

Clock message latch 112 receives and latches the output of comparator 114 and generates a phase adjusting signal indicating either a +0.5 percent, a −0.5 percent or no predetermined fixed phase adjustment. The phase adjustment signal is encoded by clock message latch 112 into a binary clock adjustment message. For example, with reference to FIG. 3 a zero adjustment is encoded as 00, a +0.5 percent adjustment is enrolled as 01, and a −0.5 percent adjustment is encoded as 10. In a similar manner, the binary clock adjustment message can be reduced to one bit, with a +0.5 percent adjustment message encoded as a binary 1 and a −0.5 percent adjustment message encoded as a binary 0. In such an arrangement a zero clock adjustment can be implemented by transmitting alternating successive clock adjustment messages. It is to be noted that the above coding is illustrative and other well known methods or formats for encoding the clock phase adjustment signal can be utilized.

Since the phase of the transmit clock signal is transmitted to the receiver as a clock adjustment signal made relative to transmit reference clock 119 which is derived from common system clock 108, the receiver can generate a receive clock which is phase adjusted with the transmit clock by merely combining the received clock adjustment signal with receive reference clock 126 which is also derived from common system clock 108. The use of common system clock 108, identical subrate dividers 116 and 125 and phase adjusters 117 and 127 nominally set to multiply by a factor of 1 assures that transmit reference clock 119 is in phase with receive reference clock 126. Hence, by combining the same clock adjustment signal to both the transmit and receive reference clock assures that the receive clock 107 is within the prescribed tolerance of the transmit clock 103. The periodic fixed increment clock adjustment maintains the synchronous operation between the user's equipment connected to transmitter 101 location and the user's equipment connected to receiver 105.

In the above description the user's transmit clock 103 is the master clock, to which the transmit reference clock 119, receive reference clock 126, and receive clock 107 are phase adjusted. If the system's transmit reference clock 119 (and therefore a receive reference clock 126) is the master clock, then in a straightforward manner transmit clock 103 and receive clock 107 could be phase adjusted using the predetermined fixed increment clock adjustment method disclosed herein. In such an implementation transmit clock 103 is in the reverse direction (towards the user's equipment).

Figure 3:
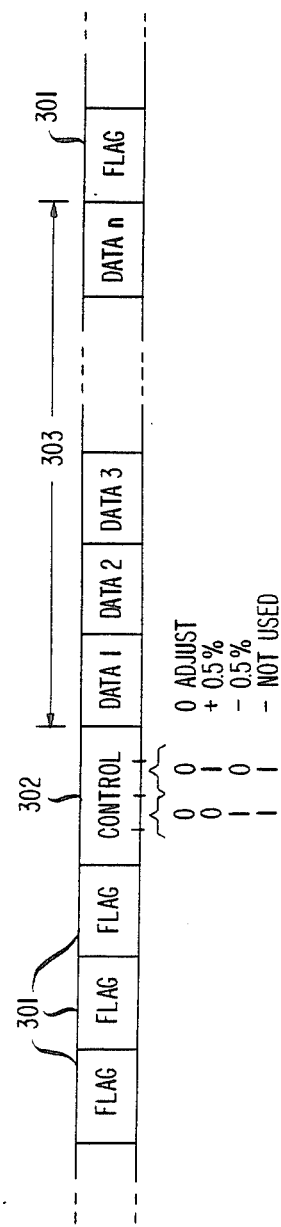
FIG. 3 shows the encoded fixed increment reference clock phase adjustment as part of the data transmission format of the synchronous data communication system.

The following description refers jointly to FIG. 1 and FIG. 3. The synchronous communication system shown in FIG. 1 operates in a bursty, non-continuous, mode. Thus, with reference to FIG. 3, during periods of time when no user data is being transmitted by transmitter 101 (circuitry not shown) flag messages 301 are continuously transmitted over facility 104. Circuitry (not shown) at the receiver 105 recognizes and discards these received flag messages. When user transmit data from FIFO 109 is transmitted a unique control word 302, which may contain more than the encoded phase adjustment signal, precedes the transmission of data words 303. As noted previously, multiplexer 110 formulates control word 302 and data words 303 from inputs from clock message latch 112 and FIFO 109. Every time clock message latch 112 is read by strobe S1, it is reset and phase adjust circuit 117 is adjusted by the clock phase adjustment signal 118. Thus, the phase difference between the transmit clock and the transmit reference clock is also reduced by the predetermined fixed increment clock phase adjustment.

Included in the described control word is the encoded clock phase adjustment bits as shown in FIG. 3. As noted previously, clock phase adjust signals are sent often enough to assure that receive clock 107 is maintained within $\pm 0.5$ percent of the transmit clock 103. Thus, a clock phase adjustment signal should be sent at least every N bits, where N is 0.5 percent divided by the sum of the drift or accuracy (in PPM) of the transmit clock and transmit reference clocks. The presence of a FIFO as a buffer at the receiver enables the clock phase adjustment to be sent on average every N bits (rather than at least every N bits). Note, the average block of transmitted data bits, N, between clock phase adjustments is the maximum long term average of the size of data blocks. Thus, in applications where longer data blocks need to be transmitted the above clock phase adjustment criteria can be modified by sending either larger or more than one fixed increment phase adjustment during each control word.

In the event that significant jitter occurs in the transmit clock, the present clock phase adjustment apparatus reduces this jitter to the fixed clock phase adjustment step size. This is due to the fact that regardless of the degree of the transmit clock jitter the adjustment at any one time is limited to the fixed clock phase adjustment step size.

Figure 2:
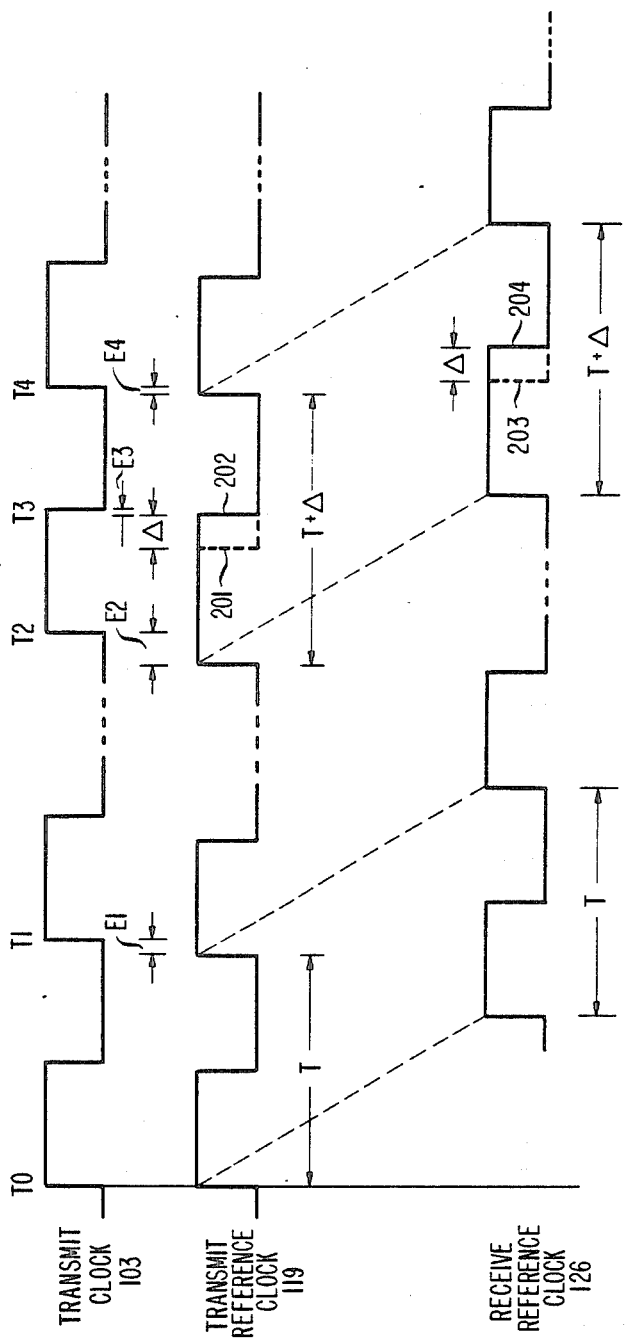
FIG. 2 shows the frequency drift between the user's transmit clock and transmit reference clock and the periodic fixed increment clock phase adjustment made to both the transmit and receiver reference clock in response thereto.

FIG. 2 illustrates the operation of the disclosed clock adjustment apparatus in response to the transmit reference clock (119) drift relative to the transmit clock (103). At time T0, the clocks are synchronized to be exactly in phase. At time T1, assume transmit reference clock is leading (at a higher frequency than) or has drifted from transmit clock by a phase difference equal to B1. Since the phase difference E1 is less than $\Delta$, the system's acceptable 0.5 percent tolerance, no clock phase adjustment is required (although as previously noted a zero clock phase adjustment or alternating $\pm 0.5$ percent and $-0.5$ percent clock phase adjustment may be sent periodically). At time T2, the phase difference E2 is more than the tolerance $\Delta$ and a clock phase adjustment of $\Delta$ ($\pm 0.5$ percent) is transmitted to receiver at time T3. Note, at time T3 edge 201 of the transmit reference clock is adjusted to 202 by the fixed clock phase adjustment $\Delta$ resulting in a residual phase difference of only E3. Thus, this clock cycle has a length of $T + \Delta$. Similarly, edge 203 of the receiver reference clock is adjusted by the fixed clock phase adjustment $\Delta$ as shown by edge 204 to become receive clock 107. At time T4, only a residual phase difference E4 remains after the transmit reference clock has been phase adjusted. The above process continues with periodic clock phase adjutment signals being sent between transmitter and receiver. If a low frequency jitter should cause phase difference E4 to be more than $2\Delta$ (more than $\pm 1$ percent) then consecutive fixed clock phase adjustment steps of $\Delta$ would be sent to the receiver from the transmitter. Note, however, that a data bit will not be gained or lost by the disclosed system unless the receive clock loses a large number of clock adjustment signals. For example, the loss of 200 adjustment steps (200 steps of a 0.5 percent equal one clock cycle) at the transmitter clock, only adds or subtracts a single data bit in the receive FIFO. Because of the small clock phase adjustment step size ($\pm 0.5$ percent) the time interval between generating the clock phase adjustment and making the corresponding adjustment in the receiver is less important as longer as there is a one to one correspondence between the transmitted and received clock phase adjustments. With larger FIFO buffers additional data bits can be stored such that the delay in making a clock adjustment in the receiver can be arbitrarily long.

With reference to FIG. 3, if an extremely long data message (303) needs to be transmitted, clock adjustments, included in the control word, can be delayed at the transmitter location until the data message transmission is completed. Of course, statistically the length of the average data message must be such that clock adjustment messages can maintain the receive clock in phase with the transmit clock.

With reference to FIG. 1 again, receiver 105 receives the multiplexed data and control word shown in FIG. 3. Demultiplexer 120 strips off the encoded clock phase adjustment bits which are then inputted, via lead 121, to clock message latch 122. Data words are inputted from demultiplexer 120, via lead 123, to FIFO 124. The output of FIFO 124 provides the user with a continuous stream of data even though data is received in burst over data facility 104. Thus, FIFO 124 provides the inverse of the previously described function of FIFO 109 of transmitter 101.

System clock 108 is counted down by subrate divider 125 to become receive reference clock 126. As previously noted receive reference clock is identical in frequency with transmit reference clock since both use a common system clock and identical subrate divider circuits. Phase adjuster circuit 127 combines clock phase adjustment signal 128 from clock message latch 122 with receive reference clock 126. Phase adjustment circuit is an adjustable counter which is programmed to multiply the receive reference clock by $1 \pm 0.005$, to provide for the $\pm 0.5$ percent clock phase adjustment step. The output frequency of phase adjuster circuit 127 is receive clock 107 which is used by the user at the receiver location to clock data from FIFO 124. Since, the user's receive clock 107 is derived from the common system clock, only periodic fixed clock phase adjustment steps (0.5 percent) are required to maintain the user's receive clock in synchronism with the user's transmit clock over long time periods.

The selection of the particular fixed clock phase adjustment step utilized in any particular synchronous data communication system should consider the required clock tolerance between user's transmit and receive clocks, the relative drift between the user's transmit clock and the common system clock, and the mode and rate of data transmission of the synchronous data communication system.

The disclosed clock adjustment method and apparatus enables a user to transmit data at its own synchronous data rate over a higher bit rate independently synchronous communication system. Since clock phase adjustment information is transmitted as a known fixed step size only one or two bits of clock information is required every so many data bits. The result is that precious little channel capacity is utilized for clock information transmission resulting in an efficient synchronous communication system. Moreover, since a clock phase adjustment information is transmitted as fixed steps the apparatus reduces user transmit clock jitter to the size of the fixed step.

Implementation of the disclosed apparatus can utilize one or more well-known standard integrated circuits to provide the disclosed functions. Moreover, the disclosed apparatus can be implemented as a custom integrated circuit or as a part of a microprocessor controlled system. Hence, the disclosed embodiments of our invention are merely illustrative and other embodiments known to those skilled in the art would provide similar functions without deviating from the scope of our invention.

What is claimed is:

1. In a synchronous data communication system comprising a transmitter, a receiver and a common reference clock, said transmitter controlled by a first clock and said receiver controlled by a second clock derived from the common reference clock and having the same nominal frequency as said first clock, apparatus at said transmitter and said receiver for adjusting the phase between said second clock and said first clock,
   said transmitter apparatus comprising:
   means for periodically comparing the phase of said first clock with a transmit reference clock derived from the common reference clock;
   means responsive to said comparing means for periodically generating a phase adjusting signal independent of said second clock indicating a predetermined fixed increment phase adjustment of a fraction of one clock pulse of the common reference clock to be made between said common reference clock and said second clock at said receiver, said predetermined fixed increment phase adjustment being independent of the magnitude of the phase difference between said first clock and said transmit reference clock;
   means for periodically transmitting said phase adjusting signal to said receiver; and
   means for adjusting the phase between said first clock and said transmit reference clock by an amount equal to said predetermined fixed increment phase adjustment.

2. The transmitter apparatus of claim 1 wherein said phase adjusting signal generating means generates a one bit binary signal indicating a positive or a negative predetermined fixed increment phase adjustment for rephasing said second clock.

3. The transmitter apparatus of claim 1 wherein said phase adjusting signal generating means generates a two bit binary signal indicating a positive, a negative, or no predetermined fixed increment phase adjustment for rephasing said second clock.

4. In a synchronous data communication system comprising a transmitter, a receiver and a common reference clock, said transmitter controlled by a first clock and a receiver controlled by a second clock derived from said common reference clock having the same nominal frequency as said first clock, a method of adjusting the phase between said second clock and said first clock,
   at said transmitter:
   periodically comparing the phase of said first clock with a transmit reference clock derived from the common reference clock;
   periodically generating in response to said comparing step a phase adjusting signal independent of said second clock indicating a predetermined fixed increment phase adjustment of a fraction of one clock pulse of the common reference clock to be made between said common reference clock and said second clock at said receiver, said predetermined fixed increment phase adjustment being independent of the magnitude of the phase difference between said first clock and said transmit reference clock;
   periodically transmitting said phase adjusting signal to said receiver; and
   adjusting the phase between said first clock and said transmit reference clock by an amount equal to said predetermined fixed increment phase adjustment.

5. The clock phase adjusting method of claim 4 wherein
   the phase adjusting signal generating step generates a one bit binary phase adjusting signal indicating a positive or a negative predetermined fixed increment phase adjustment.

6. The clock phase adjusting method of claim 4 wherein
   the phase adjusting signal generating step generates a two bit binary phase adjusting signal indicating a positive, a negative or no predetermined fixed increment phase adjustment.

7. In a synchronous data communication system comprising a transmitter, a receiver and a common reference clock, said transmitter controlled by a first clock and said receiver controlled by a second clock derived from the common reference clock and having the same nominal frequency as said first clock, apparatus at said transmitter and said receiver for adjusting the phase between said second clock and said first clock,
   said transmitter apparatus comprising:
   means for periodically comparing the phase of said first clock with a transmit reference clock derived from the common reference clock and generating a phase adjusting signal independent of said second clock indicating a predetermined fixed increment phase adjustment of a fraction of one clock pulse of the common reference clock to be made to said transmit reference clock, said predetermined fixed increment phase adjustment being independent of the magnitude of the phase difference between said first clock and said transmit reference clock;
   means for rephasing said transmit reference clock with said phase adjusting signal;
   means for periodically transmitting said phase adjusting signal to said receiver; and
   said receiver apparatus comprising:

means for receiving said phase adjusting signal;
means for rephasing a receive reference clock with the received phase adjusting signal; and
means for generating said second clock of said receiver from said rephased receive reference clock.

8. In a synchronous data communication system comprising a transmitter, a receiver and a common reference clock, said transmitter controlled by a first clock and a receiver controlled by a second clock derived from the common reference clock and having the same nominal frequency as said first clock, apparatus at said transmitter and said receiver for adjusting the phase between said second clock and said first clock, said transmitter apparatus comprising:
means for periodically comparing the phase of said first clock with said common reference clock and generating a phase adjusting signal independent of said second clock indicating a predetermined fixed increment phase adjustment of a fraction of one clock pulse of the common reference clock to be made to said first clock, said predetermined fixed increment phase adjustment being independent of the magnitude of the phase difference between said first clock and said common reference clock;
means for rephasing said first clock with said phase adjusting signal;
means for periodically transmitting said phase adjusting signal to said receiver; and
said receiver apparatus comprising:
means for receiving said phase adjusting signal;
means for rephasing said second clock relative to said common reference clock using said phase adjusting signal.

9. The transmitter apparatus of claims 7 or 8 wherein said comparing and phase adjusting signal generating means generates a one bit binary signal indicating a positive or a negative predetermined fixed increment phase adjustment.

10. The transmitter apparatus of claims 7 or 8 wherein said comparing and phase adjusting signal generating means generates a two bit binary signal indicating a positive, a negative or no predetermined fixed increment phase adjustment.

11. The apparatus of claims 7 or 8 wherein said common reference clock is generated locally at said transmitter apparatus and said receiver apparatus from a system clock signal.

12. The apparatus of claims 7 or 8 wherein said transmitting means of said transmitter apparatus further comprises
means for multiplexing said phase adjusting signal into a data stream for transmission to said receiver; and
said receiving means of said receiver apparatus further comprises
means for demultiplexing said phase adjusting signal from the received data stream.

13. In a synchronous data communication system comprising a transmitter, a receiver and a common reference clock, said transmitter controlled by a first clock and said receiver controlled by a second clock derived from the common reference clock and having the same nominal frequency as said first clock, a method of adjusting the phase between said second clock and said first clock,
at said transmitter:
periodically comparing the phase of said first clock with a transmit reference clock derived from the common reference clock and generating a phase adjusting signal independent of said second clock indicating a predetermined fixed increment phase adjustment of a fraction of one clock pulse of the common reference clock to be made to said transmit reference clock, said predetermined fixed increment phase adjustment being independent of the magnitude of the phase difference between said first clock and said transmit reference clock;
rephasing said transmit reference clock with said phase adjusting signal;
transmitting said phase adjusting signal to said receiver; and
at said receiver:
receiving said phase adjusting signal;
rephasing a receive reference clock derived from the common reference clock with the received phase adjusting signal; and
generating said second clock at said receiver from said rephased receive reference clock.

14. In a synchronous data communication system comprising a transmitter, a receiver and a common reference clock, said transmitter controlled by a first clock and a receiver controlled by a second clock derived from the common reference clock and having the same nominal frequency as said first clock, a method of adjusting the phase between said second clock and said first clock,
at said transmitter:
periodically comparing the phase of said first clock with said common reference clock and generating a phase adjusting signal independent of said second clock indicating a predetermined fixed increment phase adjustment of a fraction of one clock pulse of the common reference clock to be made to said first clock, said predetermined fixed increment phase adjustment being independent of the magnitude of the phase difference between said first clock and said common reference clock;
rephasing said first clock with said phase adjusting signal;
periodically transmitting said phase adjusting signal to said receiver; and
at said receiver:
receiving said phase adjusting signal;
rephasing said second clock relative to said common reference clock using said phase adjusting signal.

15. The clock phase adjusting method of claims 13 or 14 wherein
the periodically comparing and phase adjusting signal generating step generates a one bit binary phase adjusting signal indicating a positive or a negative predetermined fixed increment phase adjustment.

16. The clock phase adjusting method of claims 13 or 14 wherein
the periodically comparing and phase adjusting signal generating step generates a two bit binary phase adjusting signal indicating a positive, a negative or no predetermined fixed increment phase adjustment.

17. The clock phase adjusting method of claims 13 or 14 including the step of
generating a common reference clock locally at said transmitter and said receiver from a system clock signal.

18. The clock phase adjusting method of claims 13 or 14 further including the step of at said transmitter:
multiplexing said phase adjusting signal into a data stream for transmission to said receiver; and
at said receiver:
demultiplexing said phase adjusting signal from the received data stream.

* * * * *